(12) United States Patent
Freistadt et al.

(10) Patent No.: US 10,543,851 B2
(45) Date of Patent: Jan. 28, 2020

(54) PARKING ASSISTANCE SYSTEM WITH UNIVERSAL PARKING SPACE DETECTION

(71) Applicant: Bayerische Motoren Werke Aktiengesellschaft, Munich (DE)

(72) Inventors: Alois Freistadt, Oberschleissheim (DE); Dirk Ahrens, Munich (DE); Joachim Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 118 days.

(21) Appl. No.: 15/686,275

(22) Filed: Aug. 25, 2017

(65) Prior Publication Data

US 2017/0369078 A1    Dec. 28, 2017

Related U.S. Application Data

(63) Continuation of application No. PCT/EP2016/053803, filed on Feb. 24, 2016.

(30) Foreign Application Priority Data

Feb. 28, 2015   (DE) .......... 10 2015 203 619

(51) Int. Cl.
  *B60W 50/10*   (2012.01)
  *B60W 30/06*   (2006.01)
  *B60W 50/14*   (2012.01)

(52) U.S. Cl.
  CPC .......... *B60W 50/10* (2013.01); *B60W 30/06* (2013.01); *B60W 50/14* (2013.01);
  (Continued)

(58) Field of Classification Search
  CPC ... B62D 15/0285; B60W 30/06; B60W 50/10; B60W 50/14; B60W 2550/00;
  (Continued)

(56) References Cited

U.S. PATENT DOCUMENTS 8,890,716 B2 * 11/2014 Takano .............. B62D 15/0265
                                                 340/435
9,216,765 B2 * 12/2015 Inagaki .............. B62D 15/0285
              (Continued)

FOREIGN PATENT DOCUMENTS

DE   10 2009 029 553 A1   3/2011
DE   10 2009 047 283 A1   6/2011
            (Continued)

OTHER PUBLICATIONS

German-language Office Action issued in counterpart German Application No. 10 2015 203 619.7 dated Nov. 30, 2015 (5 pages).

(Continued)

*Primary Examiner* — Atul Trivedi
(74) *Attorney, Agent, or Firm* — Crowell & Moring LLP

(57) ABSTRACT

A parking assistance system executes a process to measure the parking space by a sensor prior to carrying out an automated parking maneuver and to detect the parking space type from a plurality of detectable parking space types using specific criteria on the basis of the measurement of the parking space. The plurality of parking space types includes a longitudinal parking space type, in which a vehicle can park longitudinally, a transverse parking space type, in which a vehicle can park transversely, and a universal parking space type in which the vehicle can park both longitudinally as well as transversely. In the event that the parking space has been detected as a universal parking space type, the parking assistance system provides the driver with the choice to select a parking direction, namely whether the parking assistance system is to park longitudinally or transversely into the parking space. The parking assistance system parks the vehicle into the parking space longitudinally or transversely according to the selection of the driver, (Continued)

wherein the parking trajectory depends on the selection of the driver.

17 Claims, 3 Drawing Sheets

(52) U.S. Cl.
CPC ... *B60W 2050/146* (2013.01); *B60W 2540/00* (2013.01); *B60W 2550/308* (2013.01)

(58) Field of Classification Search
CPC ....... B60W 2550/10; B60W 2550/308; B60W 2540/00; B60W 2520/04; B60W 2520/10; B60W 2050/146; G06K 9/00812
USPC .......................................................... 701/23
See application file for complete search history.

(56) References Cited

U.S. PATENT DOCUMENTS

| | | | |
|---|---|---|---|
| 9,321,485 B2* | 4/2016 | Park | B62D 15/0285 |
| 2004/0153243 A1* | 8/2004 | Shimazaki | B62D 15/0275 |
| | | | 701/300 |
| 2009/0259365 A1* | 10/2009 | Rohlfs | B62D 15/028 |
| | | | 701/41 |
| 2010/0019935 A1* | 1/2010 | Kawabata | B60R 1/00 |
| | | | 340/932.2 |
| 2010/0156671 A1* | 6/2010 | Lee | B62D 15/027 |
| | | | 340/932.2 |
| 2011/0140921 A1* | 6/2011 | Pampus | G06K 9/00812 |
| | | | 340/932.2 |
| 2011/0260887 A1* | 10/2011 | Toledo | B62D 15/0285 |
| | | | 340/932.2 |
| 2012/0062394 A1* | 3/2012 | Pampus | B62D 15/027 |
| | | | 340/932.2 |
| 2012/0191337 A1* | 7/2012 | Schoenherr | B62D 15/027 |
| | | | 701/400 |
| 2012/0197492 A1* | 8/2012 | Schneider | B62D 15/028 |
| | | | 701/41 |
| 2013/0073119 A1* | 3/2013 | Huger | B62D 15/027 |
| | | | 701/1 |
| 2013/0151060 A1* | 6/2013 | Lee | B62D 15/0285 |
| | | | 701/25 |
| 2014/0139677 A1* | 5/2014 | Lambert | B60K 35/00 |
| | | | 348/148 |
| 2014/0214499 A1* | 7/2014 | Hudson | G07F 17/246 |
| | | | 705/13 |
| 2014/0214500 A1* | 7/2014 | Hudson | G06Q 30/0284 |
| | | | 705/13 |
| 2014/0292542 A1* | 10/2014 | Bruning | B62D 15/027 |
| | | | 340/932.2 |
| 2015/0127222 A1* | 5/2015 | Cunningham, III | B60Q 1/488 |
| | | | 701/41 |
| 2015/0166062 A1* | 6/2015 | Johnson | B60W 30/12 |
| | | | 701/41 |
| 2015/0344028 A1* | 12/2015 | Gieseke | B60R 1/00 |
| | | | 701/1 |
| 2015/0344034 A1* | 12/2015 | Niino | B60W 30/16 |
| | | | 701/96 |
| 2016/0257303 A1* | 9/2016 | Lavoie | B60W 30/06 |
| 2016/0358474 A1* | 12/2016 | Uppal | G08G 1/168 |
| 2017/0015312 A1* | 1/2017 | Latotzki | B60W 30/06 |
| 2017/0072947 A1* | 3/2017 | Lavoie | B62D 15/0275 |
| 2017/0101089 A1* | 4/2017 | Bales | B60W 30/06 |
| 2017/0154530 A1* | 6/2017 | Irion | G01C 21/3685 |
| 2017/0200373 A1* | 7/2017 | Funke | B60W 30/06 |
| 2017/0211287 A1* | 7/2017 | Schmitt | E04F 11/00 |
| 2017/0334439 A1* | 11/2017 | Lee | B60W 10/184 |
| 2018/0053421 A1* | 2/2018 | Ohl | B60W 30/06 |
| 2018/0093663 A1* | 4/2018 | Kim | G08G 1/165 |
| 2018/0093664 A1* | 4/2018 | Kim | B62D 15/0285 |
| 2018/0105167 A1* | 4/2018 | Kim | B60W 30/06 |
| 2018/0162385 A1* | 6/2018 | Seo | B60W 30/06 |
| 2018/0170365 A1* | 6/2018 | Shani | B60W 30/06 |
| 2018/0186365 A1* | 7/2018 | Kim | G06K 9/00812 |
| 2018/0186407 A1* | 7/2018 | Kim | G06K 9/00812 |
| 2018/0201256 A1* | 7/2018 | Tseng | B60W 30/06 |
| 2018/0319327 A1* | 11/2018 | Cunningham, III | G08G 1/162 |
| 2018/0339700 A1* | 11/2018 | Lee | B62D 15/027 |
| 2018/0339702 A1* | 11/2018 | Kim | B60W 30/06 |
| 2018/0345955 A1* | 12/2018 | Kim | B60W 30/06 |

FOREIGN PATENT DOCUMENTS

| | | |
|---|---|---|
| DE | 10 2011 122 616 A1 | 6/2013 |
| EP | 1 862 376 A2 | 12/2007 |
| WO | WO 2008/055567 A1 | 5/2008 |

OTHER PUBLICATIONS

International Search Report (PCT/ISA/210) issued in PCT Application No. PCT/EP2016/053803 dated Apr. 29, 2016 with English translation (5 pages).
German-language Written Opinion (PCT/ISA/237) issued in PCT Application No. PCT/EP2016/053803 dated Apr. 29, 2016 (5 pages).

* cited by examiner

PARKING ASSISTANCE SYSTEM WITH UNIVERSAL PARKING SPACE DETECTION

CROSS REFERENCE TO RELATED APPLICATIONS

This application is a continuation of PCT International Application No. PCT/EP2016/053803, filed Feb. 24, 2016, which claims priority under 35 U.S.C. § 119 from German Patent Application No. 10 2015 203 619.7, filed Feb. 28, 2015, the entire disclosures of which are herein expressly incorporated by reference.

BACKGROUND AND SUMMARY OF THE INVENTION

The invention relates to a motor vehicle parking assistance system for performing an automated parking maneuver into a parking space with an at least automatic transverse guidance, in particular for automobiles.

Parking assistance systems of this type measure a parking space before performing the parking maneuver and calculate a parking trajectory for parking in the parking space on that basis.

In parking assistance systems with automated transverse guidance, the steering of the motor vehicle during the parking procedure is undertaken by the system. The driver must herself undertake the longitudinal guidance through appropriate acceleration and braking. In parking assistance systems with automated transverse guidance and automated longitudinal guidance, the task of the longitudinal guidance is also partially or fully undertaken, depending on the degree to which the longitudinal guidance is automated, by the parking assistance system. It is, for example, possible for the steering, the brakes, the vehicle drive and the direction of travel (forwards or backwards travel) to be controlled by the parking assistance system. In parking assistance systems of this type the driver has, for example, the option, through actuating an operating element, for example a button, of allowing the vehicle to park autonomously, and optionally to leave a parking space.

Parking assistance systems of this sort typically support parking in reverse lengthways to the roadway in a longitudinal parking space located parallel to the roadway, wherein the vehicle parks in reverse with automated transverse guidance and, possibly, with automated longitudinal guidance, with one or more moves along a calculated parking trajectory into the longitudinal parking space.

More recent parking assistance systems additionally also partially support reverse parking into a transverse parking space, which is transverse to the roadway. The vehicle parks in reverse with automatic transverse guidance and, possibly, automatic longitudinal guidance, with one or more moves along a calculated parking trajectory into the transverse parking space. So-called angled parking spaces that are not aligned orthogonally to the roadway may also be considered to be transverse parking spaces.

A variety of concepts underlie parking assistance systems that support both parking into longitudinal parking spaces as well as parking into transverse parking spaces. In a first group of systems the driver must preselect by way of an operating element, before the automatic search for a parking space, whether she wants to park into a longitudinal parking space or into a transverse parking space. Consequently, only longitudinal parking spaces or transverse parking spaces, as appropriate, are shown to the driver on a screen in the vehicle cockpit, into which it will then be possible to park longitudinally or transversely. In another group of systems, the driver does not have to make any preselection before the search for a parking place. Systems of this type display longitudinal parking spaces and transverse parking spaces that have been detected to the driver, and can determine automatically whether a detected parking space is a longitudinal parking space or transverse parking space.

In the case of large parking spaces which could, if only the geometry of the parking space is considered, be either a longitudinal parking space or transverse parking space (i.e. are long enough in the direction of the roadway for a longitudinal parking space and are deep enough, transverse to the roadway, for a transverse parking space), e.g. a double or triple transverse parking space, it can be the case that the parking assistance system parks longitudinally or transversely into the parking space contrary to the wishes of the driver, although the driver would like to park transversely or longitudinally in the parking space. The driver can, for example, clearly recognize, in contrast to the parking assistance system, on the basis of the parked vehicles or on the basis of an information sign, that parking into the parking space is to be transverse or longitudinal.

It is therefore the object of the invention to provide an improved parking assistance system with automatic recognition of the parking space type, wherein the above-described problem at such large parking spaces is avoided.

This and other objects are achieved by a parking assistance system in accordance with embodiments of the invention. Advantageous forms of embodiments are described herein.

One aspect of the invention relates to a parking assistance system for performing an automated parking maneuver of a motor vehicle into a parking space with at least automated transverse guidance along a parking trajectory. It also relates to parking assistance systems with automated transverse guidance and automated longitudinal guidance.

This parking assistance system is designed to measure the parking space by way of a sensor before performing the automated parking maneuver, and, on the basis of the measurement of the parking space and with reference to predetermined criteria, to recognize the parking space type of the parking space from a set of recognizable parking space types. The set of parking space types here includes a longitudinal parking space type in which it is possible to park longitudinally, and a transverse parking space type in which it is possible to park transversely.

The parking assistance system according to the invention is characterized in that the set of recognizable parking space types additionally includes a universal parking space type, in which it is possible to park both longitudinally as well as transversely. The parking assistance system is designed, in the event that the parking space is recognized as being of the universal parking space type, to give a selection option to the driver to select a parking direction, namely whether the parking assistance system should park longitudinally or transversely into the parking space. For example, a selection menu with the options of longitudinal parking and transverse parking is displayed to the driver on a screen for this purpose, wherein the system can receive a driver input (for example through a central, multifunctional operating element) to choose one of the two options. It is also contemplated, that the driver is requested by the system acoustically and/or optically to select one of the two options of longitudinal parking and transverse parking, and that the driver chooses one of the two options by voice input.

The selection option is, however, preferably not given to the driver until the vehicle has come to a halt.

The parking assistance system is designed to park longitudinally or transversely into the parking space automatically according to the selection of the driver, wherein the parking trajectory depends on the choice of the driver. Parking takes place, for example, longitudinally into the parking space along a longitudinal parking trajectory when the parking assistance system determines that the driver has chosen a longitudinal parking and, for example, transversely into the parking space along a transverse parking trajectory when the parking assistance system determines that the driver has selected transverse parking.

In the case of the parking assistance system according to the invention, in the case of universal parking spaces, into which it is possible to park both longitudinally and transversely, the driver can select the parking direction before the maneuver begins, so that the system parks in the parking space corresponding to the desired parking direction. A longitudinal parking, unwanted by the driver, in very wide parking spaces or an unwanted transverse parking in very deep longitudinal parking spaces can be prevented in this way. The parking assistance system thus behaves as desired by the driver even in such special situations.

The parking assistance system is preferably designed to recognize the parking space type with reference to predetermined criteria on the basis of the measurement of the parking space. The universal parking space type is recognized on the basis of the presence of at least two cumulative criteria, namely on the basis of the presence of a length criterion that indicates an adequate length of the parking space for longitudinal parking, and on the basis of the presence of a depth criterion, which indicates an adequate depth of the parking space for transverse parking. When the length criterion and the depth criterion (and—if present— also one or more further cumulative criteria) are satisfied, the parking space is classified as the universal parking space type.

The depth criterion is, for example, defined in that in the course of the measurement of the parking space no object limiting the depth of the parking space is detected in the parking space transverse to the roadway within the range of the sensor. For example, the sensor is for example an ultrasonic sensor with a range of x meters transverse to the roadway. The depth criterion would then be satisfied if no object is detected in the parking space within the range of the sensor of x meters transverse to the roadway.

In particular, when a sensor is used with a higher range transverse to the roadway, with which the true depth of the parking space transverse to the roadway could be measured, the depth criterion can consist in that the measured depth of the parking space (e.g. 5.1 m) transverse to the roadway is greater than a depth threshold value. The depth threshold value here corresponds preferably to the length of the vehicle itself or to the length of the vehicle itself plus an additional length in a range greater than 0 m and less than 1.0 m (e.g. approximately 0.2 m).

To determine the universal parking type, the satisfaction of a length criterion is also determined in addition to satisfaction of the depth criterion. The length criterion can, for example, comprise the precondition that the measured length of the parking space in the direction of the roadway is greater than or is greater than or equal to a specific length threshold value. The length threshold value corresponds, for example, to the length of the vehicle itself plus an additional length in the range from 0.4 m to 1.6 m (e.g. approximately 0.8 m).

A preferred parking direction (longitudinal or transverse) can be preset for the universal parking space type, in the sense of a standard or default parking direction, so that the preferred parking direction is then, for example, selected automatically. For example, the preset preferred parking direction for a universal parking space type is longitudinal parking. The preset preferred parking direction has, for example, the effect that when a parking space is recognized as being of the universal parking space type, parking in the preset parking direction can be initiated with fewer operating steps (in particular without an operating step) than parking in the other parking direction, whereby the operating convenience for the driver is increased in the case of entering the universal parking space in the preset parking direction. For example, the preset parking direction is highlighted in the selection menu for selecting the parking direction displayed before performing the parking maneuver. To select the other parking direction, the driver must perform one or a plurality of specific operating actions, for example pushing or pulling of a central multifunctional operating element in a particular direction, so that the other parking direction is highlighted, and then pressing the operating element. One or all of these operating actions are then, for example, not necessary for selection of the preset parking direction.

It is contemplated that in the absence of an explicit selection of the driver, the preset parking direction of longitudinal parking or transverse parking is automatically selected by the system, and parking is performed longitudinally or transversely into the parking space by the system in accordance with this automatic selection.

The preferred parking direction for the universal parking space type can preferably be preset by the driver herself. A factory preset parking direction can, for example, be changed by the driver into a changed preset parking direction, and then saved as the preset parking direction. For different drivers of a motor vehicle, it is also preferably possible for different preferred parking directions to be preset by the respective driver, and then stored, for example in the vehicle, in the vehicle key of the respective driver, or on a backend server.

The preset preferred parking direction can be dependent on the country or the region of the country for which the vehicle is provided. To the extent that longitudinal parking is predominant in the country or country region, longitudinal parking is, for example, preset, whereas in a country or in a country region in which transverse parking is predominant, transverse parking is, for example, preset.

It is also contemplated that the preset preferred parking direction is dependent on the location, meaning that different preferred parking directions are preset at at least two different locations. Systems for the determination of location, a satellite-supported navigation system for example, are preferably present for this purpose. For example, for two different countries (e.g. Germany and Japan), the preferred parking direction is preset differently (e.g. longitudinal parking in Germany and transverse parking in Japan). If it is determined by the system for the determination of location, that the vehicle is in a first country (e.g. Germany), a first preset parking direction (e.g. longitudinal parking) is present, whereas if it is determined that the vehicle is in a second country (e.g. Japan), a different preset parking direction (e.g. transverse parking) is present. The pre-setting of the preferred parking direction can, of course, also be different for different parking sites within a city. The triggering of the presetting can, for example, be related to individual parking areas with pluralities of parking spaces, or even to single parking spaces.

A position-related preset parking direction is preferably stored for parking at a particular local position. It is advantageous here if the position-related preset parking direction depends on at least one previous selection by the driver relating to the parking direction at a universal parking space at this position. If, at a particular position (e.g. at a particular parking space) the driver has in the past, depending on the configuration, chosen the same parking direction once or a plurality of times, this chosen parking direction becomes the preset preferred parking direction when parking again at this position. The parking history is thus included in the process.

It is in general contemplated that the preset parking direction depends on at least one earlier selection by the driver in relation to the parking direction at a universal parking space. This does not have to be position-dependent. If the driver, for example, depending on the configuration, has selected a particular parking direction once or a plurality of times at a universal parking space, this parking direction is preset as the preferred parking direction.

A second aspect of the invention relates to a method for performing an automated parking maneuver of a motor vehicle into a parking space with at least automated transverse guidance along a parking trajectory. The parking space is measured by way of a sensor before performing the automated parking maneuver and, on the basis of the measurement of the parking space, the parking space type of the parking space is recognized from a set of recognizable parking space types, wherein the set of parking space types also includes the above-described universal parking space type in addition to the longitudinal parking space type and the transverse parking space type. For the case in which the parking space is recognized as being of the universal parking space type, a selection option is given for the driver to select a parking direction, namely whether the parking assistance system should park longitudinally or transversely into the parking space. Automated parking then takes place longitudinally or transversely into the parking space according to the selection of the driver.

The above explanations regarding the parking assistance system according to the invention according to the first-described aspect of the invention also apply in a corresponding manner to the method according to the invention according to the second aspect of the invention. At this point, advantageous exemplary embodiments of the method according to the invention that are not explicitly described correspond to the advantageous exemplary embodiments of the parking assistance system according to the invention described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
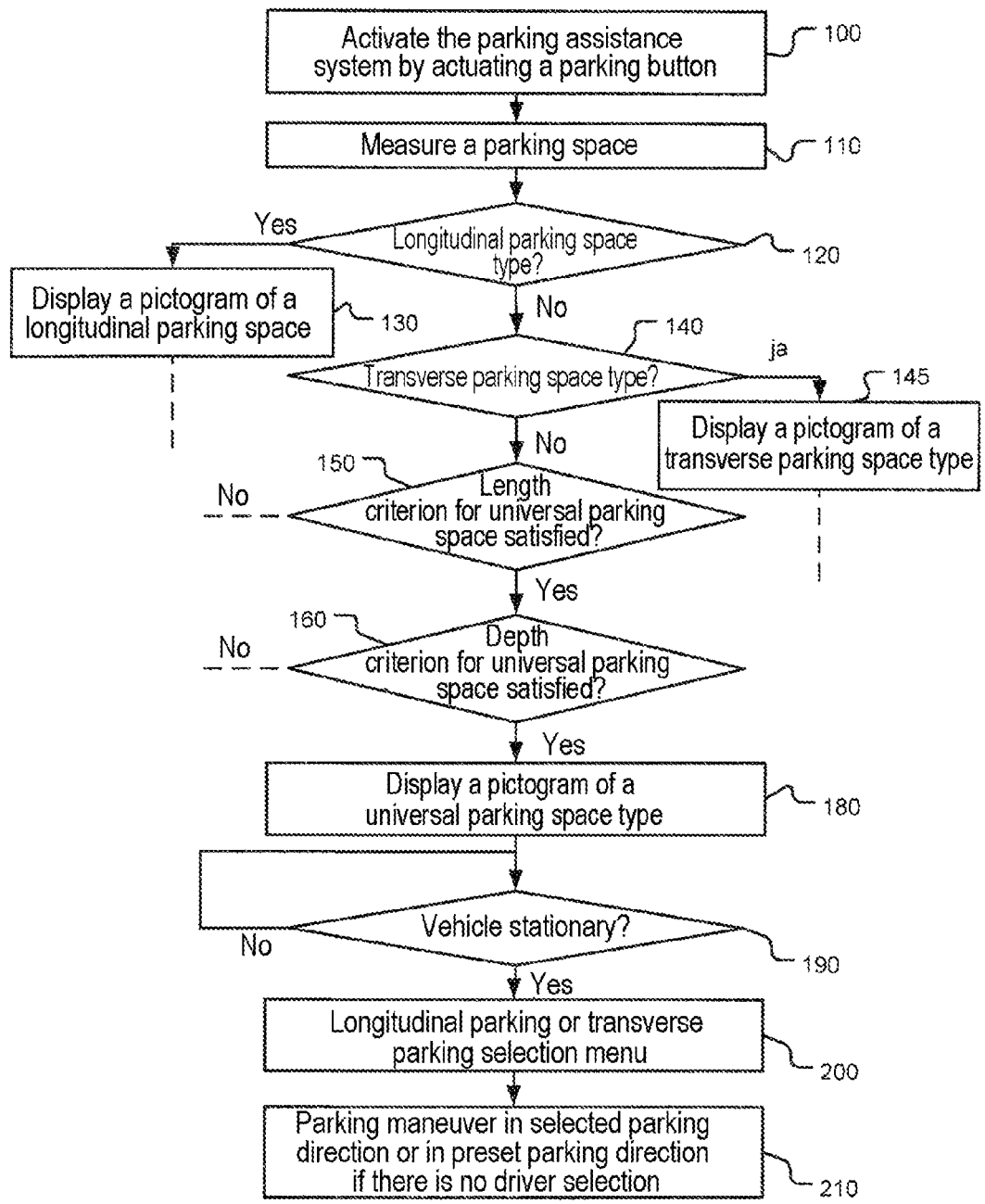
FIG. 1 is a flow chart illustrating the processing operation of an exemplary embodiment for a parking assistance system according to the invention with automated transverse guidance.

FIG. 1 shows, in a simplified manner, the method of operation of an exemplary embodiment for a parking assistance system according to the invention with automated transverse guidance. The operation is executed in an appropriately configured parking assistance system, which may include a processor and associated memory. In step 100, the parking assistance system is activated through the actuation of a parking button by the driver. After the parking assistance system has been switched on, the current status of the parking space search is displayed on a screen of the instrument panel in the vehicle cockpit. In step 110, a parking space is measured by an ultrasonic sensor while driving past the parking space.

In the query 120, a check is made as to whether the measured parking space is a parking space of the longitudinal parking space type. The parking space is, for example, classified as being of the longitudinal parking space type if the parking space has a minimum length between two objects that corresponds to the length of the vehicle itself plus about 0.8 m, and a measured depth, transverse to the roadway, of at least about 1.6 m, wherein, in contrast to the universal parking space, at least one other object limiting the depth is detected within the range of the sensor (e.g. about 4 m) in the parking space. If the parking space is recognized as a longitudinal parking space type in the query 120, a pictogram of a longitudinal parking space is displayed on the screen in step 130. A pictogram is displayed as long as the vehicle has not yet left the region from which it is possible to park in reverse into the parking space.

If a longitudinal parking space is not recognized in the query 120, a check is made in the query 140 as to whether the measured parking space is of the transverse parking space type. The parking space is, for example, classified as being of the transverse parking space type if the parking space has a width between two objects that corresponds to the width of the vehicle itself plus about 0.7 m up to a maximum of, for example, 2.8 m, and in the course of the measurement of the parking space no object is detected in the parking space transverse to the roadway within the range of the sensor (approximately 4 m). If the parking space is recognized as a transverse parking space type in the query 140, a pictogram of a recognized transverse parking space is displayed on the screen in step 145.

If no transverse parking space type is recognized in the query 140, a check is made as to whether it is a universal parking space type. A check is made for this purpose in the query 150 as to whether a length criterion for a universal parking space is satisfied which indicates an adequate length of the parking space for longitudinal parking. A check is, for example, made as to whether the measured length of the parking space between two objects in the direction of the roadway is greater than or equal to the length of the vehicle itself plus about 0.8 m. If the length criterion for a universal parking space type is satisfied, then a check is made in the query 160 as to whether a depth criterion is satisfied that indicates an adequate depth of the parking space for transverse parking. The depth criterion is, for example, satisfied, if in the course of the measurement of the parking space, no object is detected in the parking space transverse to the roadway within the range of the sensor (about 4 m). In this example the universal parking space type thus involves, so to speak, a longitudinal parking space type in which, in contrast to the longitudinal parking space type, no object that limits the depth is detected in the depth of the parking space.

If the depth criterion and the length criterion are satisfied, the parking space is classified as a universal parking space, and a pictogram of a universal parking space type is displayed on the screen in step 180.

A check is made in the query 190 as to whether the vehicle is already stationary. If the vehicle is stationary, a selection menu with the two options of longitudinal parking and transverse parking are shown to the driver on the screen in step 200. The system includes a preset, preferred parking direction for the case of universal parking space; this is marked in the selection menu, and thereby preselected. The driver can change the marked parking direction in the selection menu through pushing or pulling a central operating element, and can, by pressing the central operating element, select the marked parking direction.

Following selection of a parking direction, an automated parking maneuver in reverse in the chosen parking direction (see step 210) is performed. Should the driver not select a parking direction by pressing the central operating element, an automated parking maneuver in reverse into the preselected parking direction is initiated.

Figure 2:
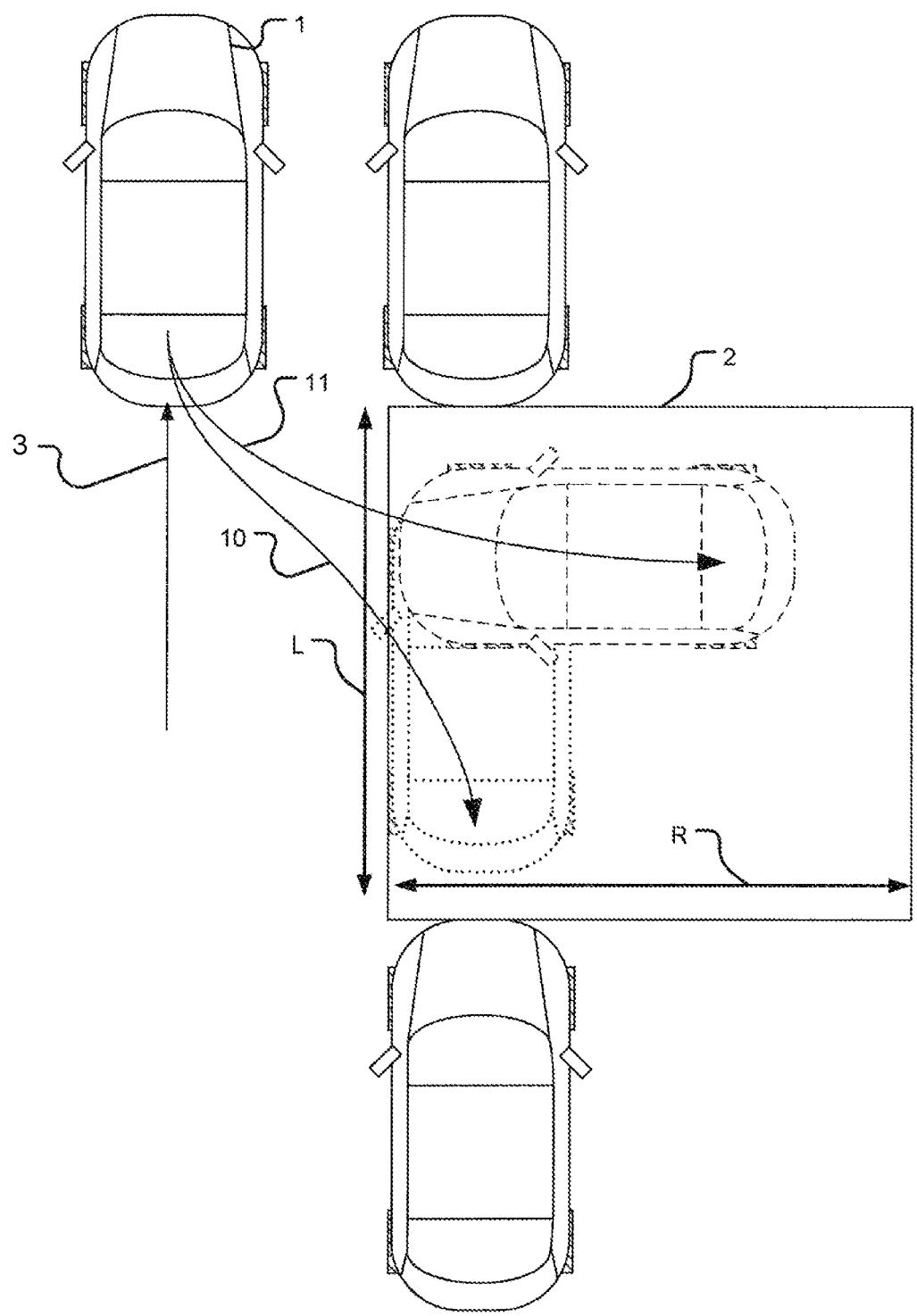
FIG. 2 is a schematic diagram of an automated parking maneuver of a motor vehicle into an exemplary parking space of the universal parking space type located on the right-hand side of the roadway.

An automated parking maneuver of a motor vehicle 1 into an exemplary parking space 2 of the universal parking space type located on the right-hand side of the roadway is illustrated in plan view in FIG. 2. The direction of the roadway corresponds to the arrow 3. The parking space 2 satisfies the exemplary length criterion described in FIG. 1, which requires an adequate length L of the parking space for longitudinal parking. The length L of the parking space is, for example, longer than the length of the vehicle itself plus about 0.8 m. The parking space 2 furthermore satisfies the exemplary depth criterion described in FIG. 1, namely that in the course of the measurement of the parking space 2 no object is detected in the parking space 2 transverse to the roadway within the range R of the ultrasonic sensor.

Depending on the choice made by the driver in the selection menu, parking then takes place according to an exemplary first parking trajectory 10 in reverse longitudinally into the parking space 2 or, according to an exemplary second parking trajectory 11, in reverse transversely into the parking space 2. The final parking position after the longitudinal parking and the transverse parking are illustrated in FIG. 2 using dots and dashes, respectively.

Figure 3:
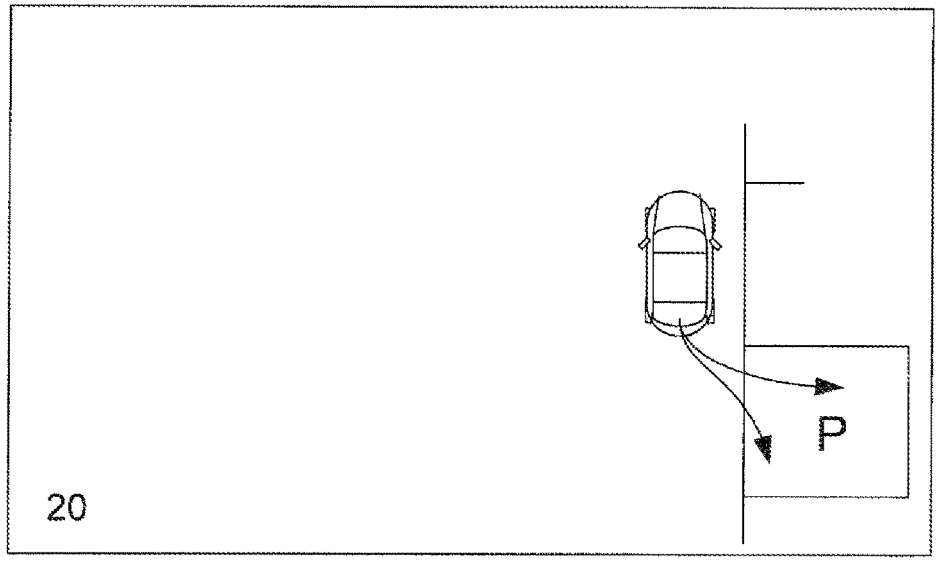
FIG. 3 is a schematic diagram of an exemplary pictogram for a universal parking space type displayed on a screen.

FIG. 3 shows an exemplary pictogram for a universal parking space type illustrated on a screen 20, that is displayed on the screen 20 after the recognition of a parking space of the universal parking space type according to step 180 in FIG. 1.

Figure 4:
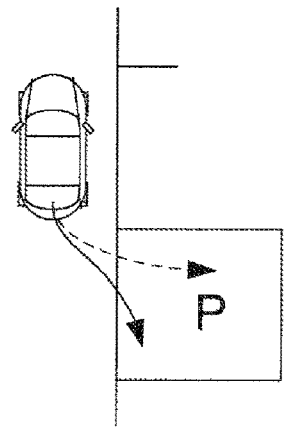
FIG. 4 is a schematic diagram of an exemplary selection menu with the options of longitudinal parking and transverse parking.

An exemplary selection menu with the options of longitudinal parking and transverse parking according to step 200 in FIG. 1, which is displayed on the screen 20, is illustrated in FIG. 4. The preferred parking direction (longitudinal parking in this case) is preselected when the menu is first displayed, and is appropriately highlighted (see the marking for "longitudinal parking"). The driver can change the highlighted parking direction in the selection menu by pushing or pulling a central operating element and can select the currently highlighted parking direction by pressing the central operating element. The highlighted parking direction is made recognizable in the pictogram (for example the currently highlighted parking direction is shown with solid lines, while the other parking direction is shown as dashes or dots, or is not even displayed at all).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for performing an automated parking maneuver of a motor vehicle into a parking space with at least automated transverse guidance along a parking trajectory, comprising:
   a parking assistance system that executes a process to:
      measure the parking space, via a sensor, before performing the automated parking maneuver,
      on the basis of the measurement of the parking space, recognize the parking space type of the parking space from a set of recognizable, different parking space types, wherein the set of parking space types comprises:
         (i) a longitudinal parking space type in which it is possible to park longitudinally,
         (ii) a transverse parking space type, in which it is possible to park transversely, and
         (iii) a universal parking space type, in which it is possible to park both longitudinally as well as transversely,
      in an event that the parking space is recognized as being of the universal parking space type, give a selection option to a driver to select a parking direction of whether the parking assistance system should park longitudinally or transversely into the parking space, and
      park the motor vehicle longitudinally or transversely into the parking space automatically according to the selection of the driver.

2. The parking assistance system as claimed in claim 1, wherein the parking assistance system further executes the process to recognize the universal parking space type with reference to predetermined, cumulative criteria, wherein
   the cumulative criteria for the recognition of the universal parking space type comprise a length criterion which indicates an adequate length of the parking space for longitudinal parking, and a depth criterion which indicates an adequate depth of the parking space for transverse parking.

3. The parking assistance system as claimed in claim 2, wherein
   the depth criterion is that in a course of the measurement of the parking space no object is detected in the parking space transverse to the roadway within the range of the sensor, or
   the depth criterion is that a measured depth of the parking space transverse to the roadway is greater than or is greater than or equal to a depth threshold value, wherein the depth threshold value corresponds to the length of the vehicle itself or the length of the vehicle itself plus an additional length in the range greater than 0 m and less than 1.0 m.

4. The parking assistance system as claimed in claim 2, wherein
   the length criterion is that a measured length of the parking space in the direction of the roadway is greater than or is greater than or equal to a specific length threshold value, and the length threshold value corresponds to the length of the vehicle itself plus an additional length in the range from 0 m to 1.6 m.

5. The parking assistance system as claimed in claim 1, wherein the parking assistance system further executes the process to:
for an event that the parking space is recognized as being of the universal parking space type, display to the driver on a screen a selection menu with options of longitudinal parking and transverse parking, and
receive a driver input for the selection of one of the options.

6. The parking assistance system as claimed in claim 1, wherein a preferred parking direction is preset for the universal parking space type.

7. The parking assistance system as claimed in claim 6, wherein, for a case in which the parking space is recognized as being of the universal parking space type, the parking assistance system is configured so that parking in the preset parking direction is initiated with fewer operating steps than parking in the other parking direction.

8. The parking assistance system as claimed in claim 6, wherein
the parking assistance system further executes the process to:
in the case in which the parking space is recognized as being of the universal parking space type, display a selection menu with the options of longitudinal parking and transverse parking to the driver on a screen, and
receive a driver input for selecting one of the two options, wherein the preset parking direction is preselected in the selection menu, and this preselection is confirmable through actuation of an operating element.

9. The parking assistance system as claimed in claim 6, wherein the parking assistance system further executes the process to:
in the absence of an explicit selection of the driver, automatically select the preset parking direction of longitudinal parking or transverse parking, and
park the motor vehicle longitudinally or transversely into the parking space in accordance with this automatic selection.

10. The parking assistance system as claimed in claim 6, wherein the preferred parking direction for the universal parking space type is preset by the driver.

11. The parking assistance system as claimed in claim 6, wherein the preset parking direction is determined based on a current geographic location of the motor vehicle.

12. The parking assistance system as claimed in claim 11, wherein
a position-related preset parking direction is stored for parking at a specific local position, and
the position-related preset parking direction depends on at least one previous selection by the driver relating to the parking direction at a universal parking space at this position.

13. The parking assistance system as claimed in claim 6, wherein the preset parking direction is determined based on a country location of the motor vehicle.

14. The parking assistance system as claimed in claim 6, wherein the preset parking direction depends on at least one earlier selection by the driver in relation to the parking direction at a universal parking space.

15. The parking assistance system as claimed in claim 6, wherein the parking assistance system further executes the process to only provide the selection option after the vehicle has become stationary.

16. The parking assistance system as claimed in claim 1, wherein the parking assistance system further executes the process to:
in a case in which the parking space is recognized as being of the universal parking space type, display a pictogram for a universal parking space type to the driver on a screen,
in a case in which the parking space is recognized as being of the longitudinal parking space type, display a pictogram for a longitudinal parking space type to the driver on a screen, and
in a case in which the parking space is recognized as being of the transverse parking space type, display a pictogram for a transverse parking space type to the driver on a screen.

17. A method for performing an automated parking maneuver of a motor vehicle into a parking space with at least automated transverse guidance along a parking trajectory, the method comprising the acts of:
measuring the parking space, via a sensor, before performing the automated parking maneuver,
on the basis of the measurement of the parking space, recognizing the parking space type of the parking space from a set of recognizable parking space types, wherein the set of parking space types comprises:
(i) a longitudinal parking space type, in which it is possible to park longitudinally
(ii) a transverse parking space type, in which it is possible to park transversely, and
(iii) a universal parking space type, in which it is possible to park both longitudinally as well as transversely, and
for a case in which the parking space is recognized as being of the universal parking space type, providing a selection option for the driver to select a parking direction of whether the parking assistance system should park longitudinally or transversely into the parking space, and
automatically parking the vehicle longitudinally or transversely into the parking space according to the selection of the driver.

* * * * *